United States Patent [19]

Mason

[11] Patent Number: 5,491,179
[45] Date of Patent: Feb. 13, 1996

[54] THERMALLY STABLE, GAMMA RADIATION-RESISTANT BLEND OF POLYCARBONATE WITH POLYESTER

[75] Inventor: James P. Mason, McKees Rocks, Pa.

[73] Assignee: Bayer Corporation, Pittsburgh, Pa.

[21] Appl. No.: 344,449

[22] Filed: Nov. 23, 1994

[51] Int. Cl.[6] .................... C08K 5/524; C08K 5/529; C08L 69/00; C08L 67/02
[52] U.S. Cl. ................ 523/136; 524/107; 524/109
[58] Field of Search ................ 523/136; 524/109, 524/107

[56] References Cited

U.S. PATENT DOCUMENTS

| | | | |
|---|---|---|---|
| 3,794,629 | 2/1974 | Eimers | 524/109 |
| 4,066,617 | 1/1978 | Rawlings | 524/109 |
| 4,102,859 | 7/1978 | Eimers | 524/109 |
| 4,786,692 | 11/1988 | Allen et al. | 525/439 |
| 5,231,124 | 7/1993 | Idel | 524/109 |
| 5,254,610 | 10/1993 | Small, Jr. et al. | 524/120 |

FOREIGN PATENT DOCUMENTS 1148966  6/1983  Canada.

*Primary Examiner*—David Buttner
*Attorney, Agent, or Firm*—Joseph C. Gil; Aron Preis

[57] ABSTRACT

An improved thermoplastic molding composition containing polycarbonate and a polyester copolymer based on cyclohexane-dimethanol, ethylene glycol and phthalic acid is disclosed. Improved thermal stability and resistance to gamma-radiation results from the incorporation of a phosphite conforming to

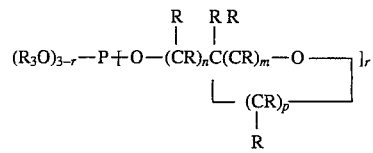

where n, m, p and r are integers, and where R is H, an alkyl or an aryl group and $R_3$ denotes an alkyl or aryl group.

10 Claims, No Drawings

THERMALLY STABLE, GAMMA RADIATION-RESISTANT BLEND OF POLYCARBONATE WITH POLYESTER

FIELD OF THE INVENTION

The invention is directed to a thermoplastic molding composition and more particularly to a composition containing polycarbonate and a polyester copolymer of cyclohexane dimethanol.

SUMMARY OF THE INVENTION

An improved thermoplastic molding composition containing polycarbonate and a polyester copolymer based on cyclohexane-dimethanol, ethylene glycol and phthalic acid is disclosed. Improved thermal stability and resistance to gamma-radiation results from the incorporation of a phosphite conforming to

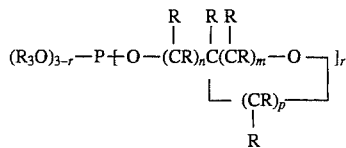

where n, m, p and r are integers, and where R is H, an alkyl or an aryl group and $R_3$ denotes an alkyl or awl group.

BACKGROUND OF THE INVENTION

Thermoplastic molding compositions containing a mixture of polycarbonate and a polyester copolymer derived from cyclohexane dimethanol and phthalic acid have been disclosed in U.S. Pat. No. 4,786,692. Characterized by their low heat distortion temperatures, high tensile and flexural strength, the compositions are said to be compatible with impact modifiers and flame retardants. The addition of phosphite and phosphate stabilizers is noted at column 11, line 64. Also included in the art is U.S. Pat. No. 5,254,610 which disclosed adding a combination of aliphatic and aromatic phosphite compounds to a blend of polyester with polycarbonate. The resulting composition is said to be advantageous in terms of unexpected thermal stability and reduction of the spray during injection molding. The phosphite of the present invention is known to impart thermal stability to polycarbonate compositions.

DETAILED DESCRIPTION OF THE INVENTION

The composition of the invention contains
(i) about 1 to 99, preferably 40 to 95, most preferably 60 to 90 percent by weight of a polycarbonate resin, and
(ii) about 1 to 99, preferably 5 to 60, most preferably 10 to 40 percent by weight of a polyester copolymer of phthalic acid and cyclohexanedimethanol (CHDM)-/ethylene glycol (EG), and
(iii) an effective amount, preferably a positive amount of up to 10 percent, more preferably 0.01 to about 10 percent, relative to the total weight of (i) and (ii) of a phosphite which contains a cyclic ether group conforming to

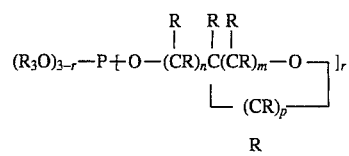

where n denotes 1 to 10, m is 1 to 10, p is 0 to 10 and r is 1 to 3, and where R is hydrogen or an alkyl or an aryl group having 1 to 10 carbon atoms and $R_3$ denotes an aryl or an alkyl group having I to 10 carbon atoms.

Aromatic polycarbonates within the scope of the present invention are homopolycarbonates and copolycarbonates and mixtures thereof.

The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

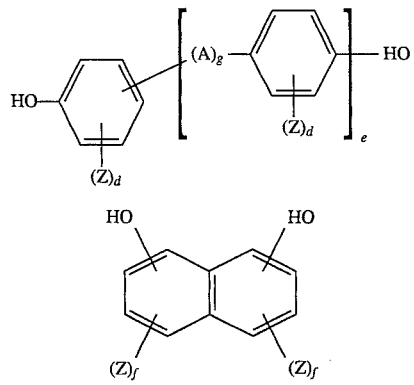

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, -80- or-$SO_2$- or a radical conforming to

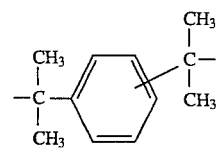

e and g both denote the number 0 to 1; Z denotes F, Cl, Br or $C_1$-$C_4$-alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α,-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methylbutane, 1,1-bis-(4-hydroxyphenyl)-cyclohexane, α,α'-bis-(4-hydroxy-phenyl)-p-diisopropylbenzene, 2,2-bis-( 3-methyl-4-hydroxyphenyl)propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis -(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxy-phenyl)-ethane; tri-(4-hydroxyphenyl)-phenylmethane; 2,2-bis-[4,4-(4,4'-dihydroxydiphenyl)-]-cyclohexylpropane; 2,4-bis-(4-hydroxy-1-isopro-pylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Miles Inc. of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The polyester copolymer of the invention comprises the reaction product of a glycol portion which contains 1,4-cyclohexane-dimethanol (CHDM) and ethylene glycol (EG) wherein the molar ratio of CHDM to EG is from about 1:1 to 4:1, preferably the glycol portion has a predominance of CHDM over EG, with an acid portion comprising at least one of phthalic acid and isophthalic acid.

The polyester copolymer component may be prepared by procedures well known to those skilled in this art, such as by condensation reactions substantially as shown and described in U.S. Pat. No. 2,901,466. More particularly, the acid or mixture of acids or alkyl esters of the aromatic dicarboxylic acid or acids, for example dimethylterephthalate, together with the dihydric alcohols are charged to a flask and heated to temperatures sufficient to cause condensation of the copolymer to begin, for example to 175° to 225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $NaHTi(OC_4H_9)_6$ in n-butanol. If a free acid is being reacted with the free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly monomeric condensation product produced can be cooled, pulverized, and the powder heated to a temperature somewhat less than that employed during the last stage of the molten phase polymerization, thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under a greatly reduced pressure.

The copolyesters for use in the subject invention generally will have an internal viscosity of at least about 0.4 dl./gm as measured in 60/40 phenoltetrachloroethane or other similar solvent at about 25° C. The relative amounts of the 1,4-cyclohexanedimethanol to ethylene glycol in the glycol portion may vary so long as the molar ratio of 1,4-cyclohexanedimethanol to ethylene glycol is from 1 to 4:1, preferably there will be a molar predominance of CHDM over EG.

A preferred copolymer for use in the subject invention is a copolyester as described above wherein the glycol portion has a predominance of 1,4-cyclohexanedimethanol over ethylene glycol, e.g. greater than 50/50 mixture and especially preferably is about 65 molar 1,4-cyclohexanedimethanol to 35 molar ethylene glycol and the acid portion is terephthalic acid. When this preferred copolyester is blended with bisphenol-A polycarbonate, the resultant blends are generally completely miscible over a broad range of the components, exhibit a single glass transition temperature indicating the formation of a single phase blend and exhibit transparency of greater than 80%. These blends show significant reduction in heat distortion temperature over polycarbonate and in addition retain very high flexural and tensile strength. A commercially available copolyester of the preferred type is Ektar DN001 PCTG sold by the Eastman Kodak Company. This resin is characterized in that it has an inherent viscosity of about 0.72 to 0.8 and a molar ratio of CHDM to EG of about 4:1.

The phosphite suitable in the context of the present invention conforms to

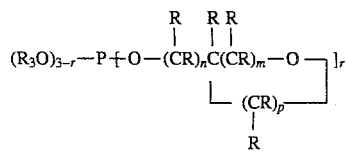

where n denotes 1 to 10, m is 1 to 10, p is 0 to 10 and r is 1 to 3, and where R is hydrogen or an alkyl or an aryl group having 1 to 10 carbon atoms and $R_3$ denotes an aryl or an alkyl group having 1 to 10 carbon atoms.

A particular phosphite found useful in the preparation of the composition of the invention is represented by

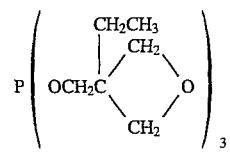

The composition of the invention may contain impact modifiers, flame retarding agents, reinforcing agents, fillers and pigments and the like all of which are known in the art for their utility in polycarbonate/polyester blends.

The composition of the invention is prepared by methods and procedures which are well known in the art.

The invention is further illustrated but is not to be limited by the following examples in which all parts and percentages are by weight unless otherwise specified.

EXAMPLES

Compositions in accordance with the invention were prepared and their properties determined. In preparing the compositions which are described below, the polycarbonate resin (PC1) was Miles' Makrolon 3100 homopolycarbonate resin based on bisphenol-A having a melt flow index of about 4.5 g/10 min. per ASTM D-1238; in examples M, N and P the polycarbonate resin (PC2) was APEC 9350 resin, a copolycarbonate based on a cyclic-bridged diphenol and BPA, a commercial product of Miles. The polyester copolymer (polyester copolymer 1) was Eastman's Ektar DN001, having an inherent viscosity of 0.72 to 0.8; a polyester copolymer (polyester copolymer 2) which although based on CHDM and EG (Kodar 6763 PETG) where the molar ratio therebetween is 20/80, and thus outside the ratio of the copolymer of the present invention, is a component in examples M, N and P.

The phosphite according to the invention (phosphite 1) used in the examples conforms to

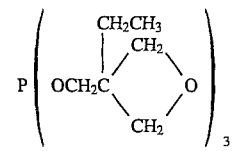

The comparative examples contained a phosphite (phosphite 2) conforming to

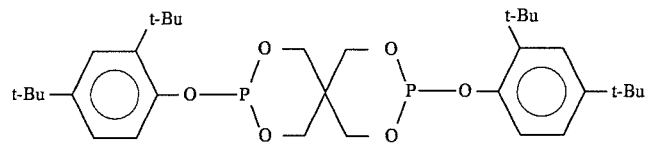

The compositions were first extruded in a twin screw extruder and plaques having a thickness of 0.100" were molded on a 3 oz. Newbury machine. Optical properties were determined by using a Diano Matchscan Spectrometer. The plaques were exposed to gamma radiation 3 Mrad and color change was then determined. The table describes the compositions in terms of their resinous components (in percent by weight) and the additives in terms of phr (per hundred resin).

Both phosphites provided good thermal stability to the PC/polyester blends as evidenced by the low YI (yellowness Index) of samples B and D and their comparison to the control composition A which contains no phosphite. Unexpectedly, however, the compositions D and K which contain the phosphite according to the invention also provided stabilization against gamma radiation as is indicated by the small change in YI ($\Delta$YI). The difference in YI is calculated by subtracting the YI before exposure to gamma radiation from the corresponding value after exposure.

|  | A | B | D | G | H | I | K | M | N | P |
|---|---|---|---|---|---|---|---|---|---|---|
| polyester copolymer 1 | 30 | 30 | 30 | 30 | 30 | 30 | 30 | | | |
| polyester copolymer 2 | | | | | | | | 20 | 20 | 20 |
| PC1 | 70 | 70 | 70 | 70 | 70 | 70 | 70 | | | |
| PC2 | | | | | | | | 80 | 80 | 80 |
| phosphate 1 | 00 | | 0.5 | | | | 0.13 | | 0.25 | |
| phosphate 2 | | 0.5 | | 0.25 | 0.13 | 0.06 | | 0.25 | | |
| TLT[1] | 83.7 | 86.8 | 187.6 | 87.0 | 87.3 | 87.1 | 87.8 | 83.9 | 86.6 | 86.8 |
| % haze | 2.9 | 2.3 | 1.4 | 1.8 | 1.5 | 1.3 | 0.8 | 3.8 | 3.4 | 2.2 |
| YI | 12.5 | 4.1 | 2.9 | 3.8 | 3.9 | 4.7 | 3.9 | 6.5 | 3.6 | 5.9 |
| properties after exposure to gamma radiation[2] | | | | | | | | | | |
| YI | 17.4 | 9.8 | 05.7 | 9.9 | 9.8 | 10.6 | 7.3 | 11.2 | 10.4 | 12.4 |
| $\Delta$YI | 4.9 | 5.7 | 2.8 | 6.1 | 5.9 | 5.9 | 3.4 | 4.7 | 6.8 | 6.5 |

[1]Total light transmission
[2]optical properties after exposure to gamma radiation followed by 14 days conditioning in darkness A second set of experiments was carried out following the preparation procedures and testing as described above. The results are tabulated below.

|  | R | S | T | U | V | W | X | Y |
|---|---|---|---|---|---|---|---|---|
| polyester copolymer 1 | 10 | 10 | 30 | 30 | 30 | 30 | 40 | 40 |
| PC1 | 90 | 90 | 70 | 70 | 70 | 70 | 60 | 60 |
| phosphite 1 | 00 | 0.13 | 0.0 | 0.01 | 0.13 | 0.5 | 0.0 | 0.13 |
| YI | 3.6 | 3.8 | 13.1 | 4.6 | 3.9 | 2.9 | 15.2 | 4.5 |
| YI[2] | 13.7 | 11.8 | 18.0 | 9.3 | 7.3 | 5.7 | 18.8 | 7.6 |
| $\Delta$YI | 10.1 | 8.0 | 4.8 | 4.7 | 3.4 | 2.8 | 3.6 | 3.1 |

[2]properties after exposure to gamma radiation followed by 14 days conditioning in darkness Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) about 1 to 99 percent by weight of a polycarbonate resin, and
   (ii) about 1 to 99 percent by weight of a polyester copolymer of phthalic acid and a mixture of cyclohexanedimethanol and ethylene glycol and
   (iii) an effective positive amount of a phosphite compound conforming to

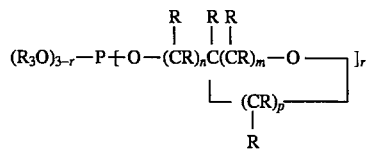

where n denotes 1 to 10, m is 1 to 10, p is 0 to 10 and r is 1 to 3, and where R is hydrogen or an alkyl or an aryl group having 1 to 10 carbon atoms and $R_3$ denotes an aryl or an alkyl group having 1 to 10 carbon atoms, said effective amount being sufficient to improve the resistance of the composition to degradation caused by exposure to gamma radiation as reflected in change in yellowness index, said cyclohexane dimethanol and said ethylene glycol being present in said polyester copolymer in a molar ratio of 1:1 to 4:1 therebetween, said percent in both occurrances being relative to the total weight of said (i) and (ii).

2. The composition of claim 1 wherein said polycarbonate is present in an amount of 40 to 95 percent by weight.

3. The composition of claim 1 wherein said polycarbonate is present in an amount of 60 to 90 percent by weight.

4. The composition of claim 2 wherein said polyester copolymer is present in an amount of 5 to 60 percent.

5. The composition of claim 3 wherein said polyester copolymer is present in an amount of 10 to 40 percent by weight.

6. The composition of claim I wherein said effective positive amount is about 0.01 to about 10 percent relative to the total weight of (i) and (ii).

7. The composition of claim 1 wherein said phosphite conforms to

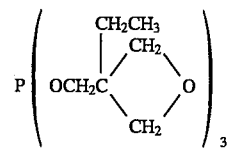

8. The composition of claim 6 wherein said phosphite conforms to

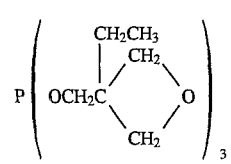
9. The composition of claim 1 wherein said (i) is a homopolycarbonate derived from bisphenol-A.
10. The composition of claim 8 wherein said (i) is a homopolycarbonate derived from bisphenol-A.
* * * * *